US008676248B2

(12) United States Patent
Weinrib et al.

(10) Patent No.: US 8,676,248 B2
(45) Date of Patent: Mar. 18, 2014

(54) DEVICE, METHOD, AND MEDIUM FOR OPTIMIZING SIMULTANEOUS LONG TERM EVOLUTION (LTE) SIGNALS AND SIGNALS IN THE INDUSTRIAL, SCIENTIFIC, AND MEDICAL (ISM) RADIO BAND

(75) Inventors: Uri Weinrib, Lod (IL); Alon Paycher, Moshav Belt Hananya (IL); Keren Dor, Herzelia (IL)

(73) Assignee: Texas Instruments Incorporated, Dallas, TX (US)

( * ) Notice: Subject to any disclaimer, the term of this patent is extended or adjusted under 35 U.S.C. 154(b) by 10 days.

(21) Appl. No.: 13/561,956

(22) Filed: Jul. 30, 2012

(65) Prior Publication Data

US 2014/0031077 A1 Jan. 30, 2014

(51) Int. Cl.
*H04B 7/00* (2006.01)
*H04W 36/00* (2009.01)
*H04W 48/20* (2009.01)
*H04W 36/30* (2009.01)

(52) U.S. Cl.
CPC .............. *H04W 48/20* (2013.01); *H04W 36/30* (2013.01)
USPC ........ 455/525; 455/436; 455/552.1; 370/332; 370/338

(58) Field of Classification Search
USPC ................... 455/524, 525, 552.1, 553.1, 436; 370/331, 332, 333, 338
See application file for complete search history.

(56) References Cited

U.S. PATENT DOCUMENTS

| | | | | |
|---|---|---|---|---|
| 6,580,700 B1 * | 6/2003 | Pinard et al. | .................. | 370/332 |
| 6,990,116 B1 * | 1/2006 | Young et al. | .................. | 370/445 |
| 7,539,169 B1 * | 5/2009 | O'Hara et al. | ................ | 370/338 |
| 7,627,318 B2 * | 12/2009 | Yasuda | ......................... | 455/436 |
| 7,957,339 B2 * | 6/2011 | Thermond et al. | ............ | 370/328 |
| 8,068,871 B2 * | 11/2011 | Xhafa et al. | ............... | 455/552.1 |
| 8,498,574 B2 * | 7/2013 | Beninghaus et al. | ........ | 455/63.1 |
| 8,537,774 B2 * | 9/2013 | Robson et al. | ................ | 370/331 |
| 2010/0029325 A1 * | 2/2010 | Wang et al. | ................ | 455/553.1 |
| 2010/0165959 A1 | 7/2010 | Park et al. | | |
| 2012/0008551 A1 * | 1/2012 | Giaretta et al. | ............... | 370/328 |
| 2012/0040715 A1 * | 2/2012 | Fu et al. | ..................... | 455/553.1 |
| 2012/0093009 A1 | 4/2012 | Wang et al. | | |
| 2012/0113839 A1 | 5/2012 | Etemad | | |
| 2012/0294293 A1 * | 11/2012 | Kahn et al. | ..................... | 370/338 |
| 2012/0327850 A1 * | 12/2012 | Wang et al. | ................... | 370/328 |
| 2013/0065633 A1 * | 3/2013 | Sridhara et al. | ............... | 455/525 |
| 2013/0100819 A1 * | 4/2013 | Anchan et al. | ................ | 370/241 |

* cited by examiner

*Primary Examiner* — Duc M Nguyen
(74) *Attorney, Agent, or Firm* — Ronald O. Neerings; Wade James Brady; Frederick J. Telecky, Jr.

(57) ABSTRACT

A wireless communication device includes a processing unit with first chip and second chip that operates in parallel with the first chip. The first chip transmits/receives data according to LTE. The second chip transmits/receives data over a WLAN. The processing unit determines access points (AP) through which data can be transmitted/received by the second chip over the WLAN; and identifies an optimal AP, based on factors including a determination, for each AP, of whether transmission/reception of data by the first chip according to the LTE standard, simultaneous to transmission/reception of data over the WLAN by the second chip, would decrease the overall throughput of the first and second chips. When the second chip is previously connected to the WLAN through any AP other than the optimal AP, the second chip is disconnected from the other AP, and it is connected to the WLAN through the optimal AP.

20 Claims, 3 Drawing Sheets

DEVICE, METHOD, AND MEDIUM FOR OPTIMIZING SIMULTANEOUS LONG TERM EVOLUTION (LTE) SIGNALS AND SIGNALS IN THE INDUSTRIAL, SCIENTIFIC, AND MEDICAL (ISM) RADIO BAND

TECHNICAL FIELD

The technical field relates in general to wireless communication of data by a communication device, and more specifically, to simultaneous wireless communication of data according the long term evolution (LTE) standard and wireless communication within the industrial, scientific, and medical (ISM) radio band.

BACKGROUND

Some wireless communication devices, including wireless phones and wireless tablets, transmit and receive data wireless according to multiple protocols. These protocols can broadly be characterized as involving long range and short range communications. Wireless communication devices may perform short range (for example, less than 30 meters) communications according to a short range protocol such as the IEEE 802.11 ("802.11") specification.

The 802.11 specification is more commonly known as "WiFi," which is the commercial name for the standard. Most wireless local area networks (WLANs), which link two or more devices using a wireless distribution method, implement the 802.11 standard. Wireless signals transmitted according to the 802.11 specification propagate at a frequency of 2450 MHz (2.45 GHz).

Wireless signals produced according the 802.11 are characterized by a frequency that is within an ISM radio band. As indicated by the name, ISM radio bands are portions of the radio spectrum that are reserved internationally for the use of radio frequency (RF) energy for industrial, scientific and medical purposes, other than communications. Examples of applications in the ISM bands include radio-frequency process heating, microwave ovens, and medical diathermy machines. The powerful emissions of these devices can create electromagpetic interference and disrupt radio communication using the same frequency. This is the reason that these ISM devices were limited to certain bands of frequencies.

Despite the intent of the original allocation, in recent years the fastest-growing uses of the ISM bands have been for short-range, low power communications systems such as WLAN communication according to the 802.11 standard. Additional communication systems that operate in the ISM band are cordless (non-mobile) phones, Bluetooth™ devices, and near field communication (NFC) systems. Generally speaking, communications equipment operating in the ISM band must tolerate interference generated by ISM equipment, and users have no regulatory protection from an ISM device.

However as it turns out, a bigger issue effecting WLAN communications relates to simultaneous wireless communications generated according to one or more long rang protocols. These long range protocols include standards promulgated by the 3rd Generation Partnership Project (3GPP), including "3G," which is a generation of standards for mobile phones and mobile telecommunication services fulfilling the International Mobile Telecommunications-2000 (IMT-2000) specifications by the International Telecommunication Union. Other more recent long range protocols are the "4G" protocols which include the Worldwide Interoperability for Microwave Access (WiMAX) specification as well as the Long Term Evolution (LTE) standard.

The WiMAX specification is a commercial implementation of the IEEE 802.16 family of wireless-networks standards. The WiMAX standard provides for 30 to 40 megabit per second data rates over a range far surpassing the 30-meter wireless range of a conventional WLAN. Specifically, WiMAX signals are offered with a signal radius of about 50 km.

The LTE standard, which has been marketed as 4G-LTE, is a standard for wireless communication that was developed by the 3GPP, and is specified in the Project's Release 8 document series, with minor enhancements described in Release 9. The LTE standard for wireless data communications is an evolution of the Global System for Mobile Communications (GSM)/Universal Mobile Telecommunications System (UMTS) standards. The goal of the LTE standard was to increase the capacity and speed of wireless data networks using new digital signal processing techniques and modulations that were developed around the year 2000. A further goal was the redesign and simplification of the network architecture to an IP-based system with significantly reduced transfer latency compared to the 3G architecture.

As mentioned above, certain problems arise when a wireless communication device simultaneously processes a WLAN signal and a 3G or 4G LTE signal. The problems arise because the 3G and 4G LTE standards are implemented with signals having frequencies that border or overlap the ISM band within which WLAN (and Bluetooth™) signals propagate. Because of this overlap in signals, for example, when an LTE signal is transmitted by a device at an overlapping frequency, a simultaneously transmitted WLAN signal may be blocked from being received by the device. Additionally, when a signal is transmitted by the device over a WLAN, the signal may be intermodulated with an LTE signal being received by the device. What is needed therefore is a wireless communication device that can simultaneously process WLAN and LTE signals and can account for the overlap in the frequencies of the WLAN and LTE signals.

SUMMARY

Accordingly, one embodiment described herein relates to a device that is operable to transmit and receive data wirelessly. The device comprises a processing unit that includes a first chip that transmits and receives data according to a long term evolution (LTE) standard. The processing unit further includes a second chip that operates in parallel with the first chip, and transmits and receives data over a wireless local area network (WLAN).

The processing unit is configured to determine a plurality of access points (AP) through which data can be transmitted and received by the second chip over the WLAN. The processing unit is further configured to identify an optimal AP based on a plurality of factors including at least a determination, for each different AP, of whether transmission or reception of data by the first chip according to the LTE standard, simultaneous to the transmission or reception of data over the WLAN by the second chip, decreases the overall throughput of the first chip and the second chip.

The second chip may be previously connected to the WLAN through any AP other than the optimal AP. When this is the case, the processing unit is further configured to disconnect the second chip from the any AP other than the optimal AP. The processing unit if further configured to connect the second chip to the WLAN through the optimal AP.

A method is also described herein that is implemented in a device that is operable to transmit and receive data wirelessly. The device comprises a processing unit that includes a first chip that transmits and receives data according to a long term evolution (LTE) standard. The processing unit further includes a second chip that operates in parallel with the first chip and that transmits and receives data over a wireless local area network (WLAN).

The method comprises determining, by the processing unit, a plurality of access points (AP) through which data can be transmitted and received by the second chip over the WLAN. The method further comprises identifying, by the processing unit, an optimal AP based on a plurality of factors including at least a determination, for each different AP, of whether transmission or reception of data by the first chip according to the LTE standard, simultaneous to the transmission or reception of data over the WLAN by the second chip, would decrease the overall throughput of the first chip and the second chip.

The second chip may be previously connected to the WLAN through any AP other than the optimal AP. The method further comprises, when the second chip is previously connected to the WLAN through any AP other than the optimal AP, disconnecting, by the processing unit, the second chip from the any AP other than the optimal AP. The method further comprises the processing unit connecting the second chip to the WLAN through the optimal AP.

A non-transitory computer readable storage medium is also disclosed. The storage medium has instructions stored thereon. When the instructions are executed by a processing unit as described above, in a wireless communication device as described above, the method steps described above are performed.

It should also be noted that the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is not intended to define the invention of the application, which is measured solely by the claims. The abstract is not intended in any way to be limiting as to the scope of the invention.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

DETAILED DESCRIPTION

In overview, the present disclosure concerns wireless communications in a device wherein signals are simultaneously transmitted and received both over a WLAN and according to an LTE standard. Devices that accommodate WLAN and LTE signals typically process these signals using two dedicated chips: one chip for processing WLAN signals and the other chip for processing LTE signals. For simplicity, reference in the remainder of this disclosure may sometimes be made to a WLAN chip and an LTE chip for the respective chips that process WLAN and LTE signals.

As described further below, wireless communication devices conventionally do not consider the effect of LTE signals on the processing of WLAN signals by the WLAN chip, and correspondingly do not consider the effect of WLAN signals on the processing of LTE signals by the LTE chip. The effects, as mentioned above, include blocking and intermodulation. The embodiments described and claimed herein focus on identifying and connecting to an optimal access point (AP) in a WLAN, by the WLAN chip, when considering the effect of simultaneous LTE communications on the overall throughput of the WLAN chip and the LTE chip.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items, or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

As further discussed herein below, various inventive principles and combinations thereof are advantageously employed to reduce blocking and intermodulation of simultaneous WLAN and LTE signals, respectively. In order to understand how this is achieved by the claimed embodiments, it is important to understand the nature of wireless communication signals in the ISM band as well as the nature of 3G, 4G, and 4G LTE signals, and the frequencies at which they propagate. Thus FIG. 4, which illustrates a chart 400 of frequency ranges of wireless communication signals in the ISM band and 3G and 4G signals, is discussed and described.

Figure 4:
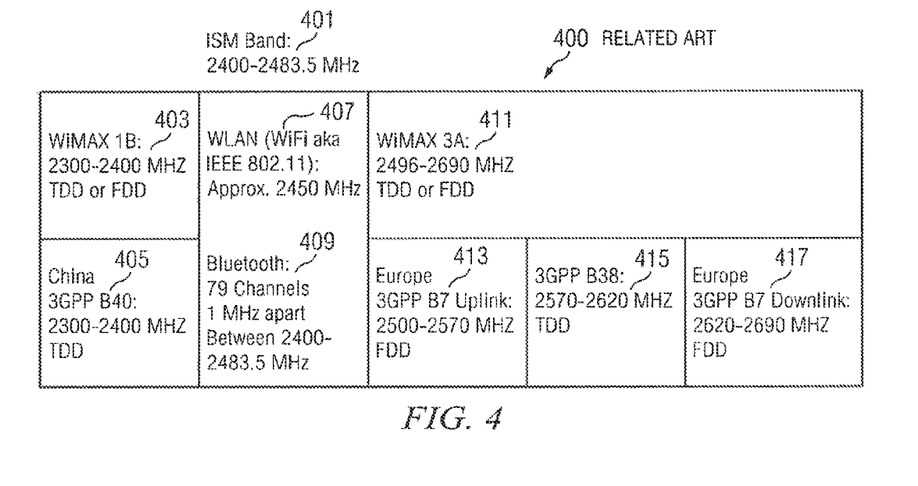
FIG. 4 is a diagram illustrating a chart of frequency ranges of wireless communication signals in an ISM wireless band and frequency ranges of 3G and 4G LTE signals.

The chart 400 initially shows that two different wireless technologies that propagate signals in a portion of the ISM band 401 at 2400 MHz-2483.5 MHz. Specifically WLAN signals 407, which as indicated above are signal produced according to the 802.11/WiFi standard, propagate over several channels (varying from country to country) within the 2.4 GHz ISM band, and are summarized in chart 400 simply as being approximately 2450 MHz. Bluetooth™ 409 signals are produced by a frequency-hopping spread spectrum, which chops up the data being sent and transmits chunks of it on up to 79 bands that are 1 MHz apart and are centered from 2402 to 2480 MHz in the range 2,400-2483.5 MHz.

As a can be seen from the chart 400, Bluetooth™ 409 signals and WLAN 407 signals share adjacent frequency bands to signals produced according to various 3G and 4G standards. For example, LTE signals are produced according to various modes depending upon which country or part of the world a device is being operated in. In Europe, LTE signals promulgated using Frequency Division Duplexing (FDD) on 3GPP Band 7, as indicated by reference character 413, are uplinked (transmitted) in a frequency range between 2500-2570 MHz.

Because of the proximity of the frequency range of the 3GPP Band 7 transmissions to the frequency range of WLAN signals, downlinks (receptions) of WLAN signals by a WLAN chip may be blocked. Thus in Europe, if an LTE signal 413 is transmitted at 2500 MHz, there may not be a filter, and there may not be enough of a spread, to prevent the 2500 MHz LTE signal from being received by the WLAN chip in the wireless communication device. Therefore an actual simultaneous WLAN signal at 2480 MHz would be blocked from being received by the WLAN chip.

As a can further be seen from the chart 400, in China LTE signals are promulgated and received using Time Division Duplexing (TDD) on 3GPP Band 40, as indicated by reference character 405. Using TDD, signals are uplinked and downlinked in the same frequency range, between 2300-2400 MHz. Because of the proximity of the frequency range of the 3GPP Band 40 transmissions to the frequency range of WLAN signals, downlinks of WLAN signals by a WLAN chip may be blocked. For example, in China if an LTE signal 405 is transmitted at 2390 MHz, there may not be a filter, and there may not be enough of a spread, to prevent the 2390 MHz LTE signal from being received by the WLAN chip in the wireless communication device. Therefore an actual simultaneous WLAN signal at 2410 MHz will be blocked from being received by the WLAN chip.

It should be noted that in some circumstances, blocking of signals intended for the LTE chip can also occur. Since LTE signals 405 in China are uplinked and downlinked in the same frequency range, there may not be a filter, and there may not be enough of a spread, to prevent a 2390 MHz WLAN signal, for example, from being received by the LTE chip in the wireless communication device. Therefore an actual simultaneous LTE 2390 MHz will be blocked from being received by the LTE chip.

As mentioned above, intermodulation also occurs as a result of LTE frequency bands that are adjacent to the WLAN frequency band. Intermodulation is simply the production of a signal that is of a frequency that is a difference of frequencies of different inputs. Thus, as a result of simultaneous uplinks of both an LTE signal and WLAN signal on two channels simultaneously, an intermodulated signal is received in a third channel. The intermodulation created is given by the formula: $2*[\text{Center Frequency }(1^{st})-\text{Center Frequency }(2^{nd})]=\text{Intermodulated Signal}$.

In Europe, LTE signals are downlinked using FDD on 3GPP Band 7, as indicated by reference character 417, in a frequency range between 2620-2690 MHz. If an LTE chip uplinks an LTE signal on 3GPP B7 Uplink (at 413), and simultaneously the WLAN chip transmits an WLAN signal according to the 802.11 standard, the signal received on 3GPP B7 Downlink (at 417) may be intermodulated. Thus for example, an intermodulated signal may be equal to 2 [Center Frequency (WLAN Signal)−Center Frequency (LTE Signal)] →2 [Center Frequency (WLAN Signal)−2525 MHz on Channel 1]=Intermodulation on 2645 MHz at 3GPP B7 Downlink 417

It should be quickly noted that chart 400 also illustrates that WiMAX signals promulgating on WiMAX Band 1 (at 403) are processed using FDD and TDD in a frequency range of 2300-2400 MHz. Additionally, WiMAX signals promulgating on WiMAX Band 3A (at 411) are processed using FDD and TDD in a frequency range of 2496-2690 MHz. Lastly, and as can further be seen from the chart 400, LTE signals are promulgated and received using TDD on 3GPP Band 38, as indicated by reference character 415. Using TDD, signals are uplinked and downlinked in the same frequency range, between 2570-2620 MHz. All of the above signals are subject to the problems of blocking and intermodulation when considered in view of WLAN or Bluetooth™ transmission and reception of signals There are various physical locations where a wireless communication device will simultaneously communicate over a WLAN and an LTE network. Examples of such locations include malls, restaurants, work places, sporting arenas, etc. In these areas, a wireless communication device will communicate according to the 802.11 specification with a wireless AP that is further connected to a router (via a wired network) or is itself a router.

In each physical location where a wireless communication device operates over a WLAN, APs may be provided at regular distance intervals. For example, there may be provided an AP every certain number of square meters. A network of APs is thus formed.

Each AP may operate over a slightly different frequency (known as a channel). In this way, the network load can be spread among the different APs. In addition, interference is reduced.

Figure 1:
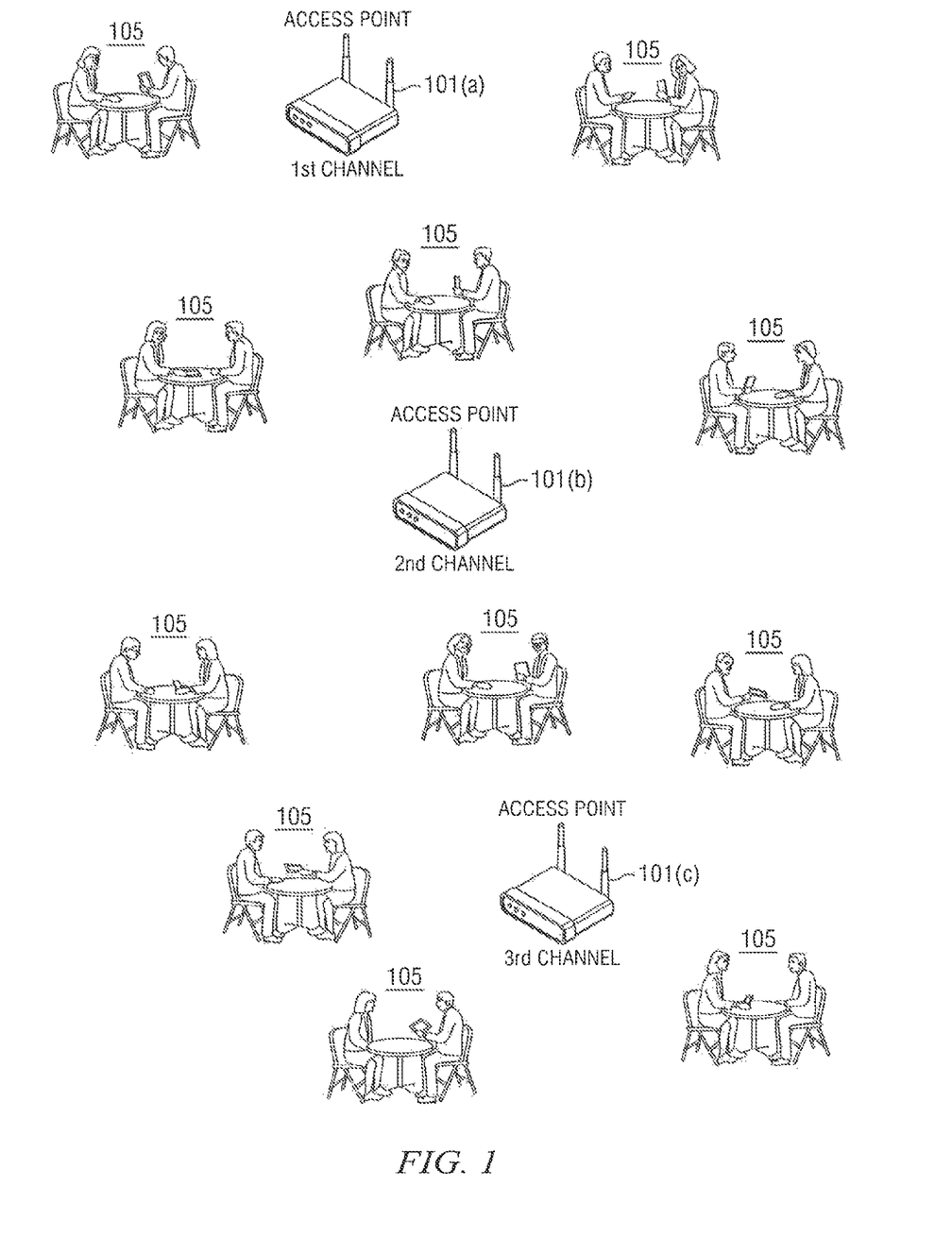
FIG. 1 is a diagram illustrating a WLAN environment, with a plurality of access points (APs), in which one or more wireless communication devices operate.

FIG. 1, which is a diagram illustrating a WLAN environment, with a plurality of APs, in which one or more wireless communication devices operates, is now discussed and described. As can be seen in the drawing, there are pluralities of individuals 105 each carrying a wireless communication device. In order to accommodate each individual 105 carrying a wireless communication device, several APs 101(*a*), 101(*b*), 101(*c*) are provided through which the wireless communication devices can communicate using the 802.11 (WiFi) standard.

As can be seen in FIG. 1, the APs 101(*a*), 101(*b*), 101(*c*) each operate on a different channel, namely a $1^{st}$ channel, $2^{nd}$ channel, and $3^{rd}$ channel, respectively. It should be noted that the particular labeling here of the channels at $1^{st}$, $2^{nd}$, and $3^{rd}$ does not indicate any particular frequency, but only that the $1^{st}$, $2^{nd}$, and $3^{rd}$ channels are each different from the other. Although it may appear that a wireless communication device in the WLAN (as held by an individual 105) communicates with a geographically closest AP, this is not necessarily the case.

Rather, conventionally a wireless communication device determines which AP to connect with by scanning for each of the plurality of APs, and providing a grade for each of the plurality of APs. The grade for each AP is based on a number of factors including, for example, an individual AP's performance speed capability/capacity, network load, received signal strength indication (RSSI), and signal-to-noise ratio (SNR) of the AP. An AP with the highest grade is selected by an individual wireless communication device for establishing WLAN communication. However, what is not considered, conventionally, is the effect of LTE signals on WLAN processing, the effect of WLAN signals on LTE processing, and their mutual effect on throughput of a device.

A novel wireless communication device in accord with the inventive principles described herein includes a first chip that is configured to transmit and receive data according to the LTE standard. The device will further include a second chip configured to operate in parallel with the first chip, and will transmit and receive data over a WLAN. The first and second chips together form a processing unit. When the novel wireless communication device is introduced into the environment illustrated in FIG. 1, the device again scans for all potential APs through which WLAN communications may occur.

Then, the processing unit identifies an optimal AP. The optimal AP is identified based on a plurality of factors that includes at least a determination for each different AP, of whether transmission or reception of data by the first chip according to the LTE standard, simultaneous to transmission or reception of data over the WLAN by the second chip, would decrease the throughput of the first chip and the second chip. In particular, the specific channel of each different AP will be analyzed in view of the known frequencies of adjacent LTE bands in order to determine whether any LTE signals will block reception of WLAN signals designated for the second chip. If so, throughput of the second chip would be reduced. Additionally, the specific channel of each different AP will be analyzed in view of the known frequencies of adjacent LTE bands in order to determine whether any signals received by the first chip will be intermodulated. If so, throughput of the first chip would again be reduced.

It should be noted that an identification of an optimal AP is both determined as soon as wireless communication device is within the range of a WLAN, and continues to be determined as the device is maintained within the range of the WLAN. Thus, prior to connecting with an optimal AP, the processing unit determines whether the second chip is previously connected with an AP other than the optimal AP. When the second chip is previously connected to the WLAN through any AP other than the optimal AP, the second chip is disconnected from the non-optimal AP. The second chip is then connected to the optimal AP. It should be noted that the expression "connected to" as used above simply means that the second chip is configured to transmit and receive data on a particular channel that is being used by a particular AP. The expression "disconnect" simply indicates that data is no longer transmitted and received on the particular channel.

As mentioned above, conventionally there are several factors that are considered in determining the AP with which a WLAN device connects. Again those factors may include an individual AP's performance speed capability/capacity, network load, RSSI, and SNR. This list is not meant to be exhaustive. These and other factors may also further be included in the identification of an optimal AP for a wireless communication device.

Specifically, identifying the optimal AP may include providing an initial grade to each of the plurality of APs based on the factors described above. Such a grading is conventionally performed, as discussed above. However, where a determination that the transmission or reception of data by the first chip according to the LTE standard, simultaneous to the transmission or reception of data over the WLAN by the second chip of a particular AP, would decrease the overall throughput of the first chip and the second chip of the particular AP, the grade of the particular AP is downwardly adjusted. Once each of the plurality of APs' grades have been adjusted to account for the impact of simultaneous WLAN and LTE signals on the overall throughput of the first chip and second chip, a highest graded AP can be identified.

An example of the grading scenario above is now provided in the following table:

TABLE 1

| Access Point | Initial Grade | Normal Rank | Adjusted Grade | Final Rank |
| --- | --- | --- | --- | --- |
| AP(1) | 42 | 4 | 40 | 4 |
| AP(2) | 56 | 3 | 56 | 1 |
| AP(3) | 58 | 2 | 54 | 2 |
| AP(4) | 64 | 1 | 52 | 3 |

In the current example, as can be seen in TABLE 1, there are 4 access point in the given WLAN, which are AP(1), AP(2), AP(3), and AP(4). As described above, each AP is provided an initial score and/or grade that is based on several factors. In some sense, all of the factor ultimately relate to throughput of the wireless communication device being used in the WLAN.

Stated another way, although factors such as RSSI and SNR relate to signal quality, the ultimate concern, even considering these factors, is on how much data can be reliably processed in a given time period by a wireless communication device. In the current example, an initial score, which reflects an overall throughput of a wireless communication device in terms of both WLAN and LTE data communications (but without a consideration of simultaneous WLAN and LTE communications) is provided. Thus, AP(1) is provided a grade of 42; AP(2) is provided a grade of 56; AP(3) is provided a grade of 58; and AP(4) is provided a grade of 64.

As is fairly clear from TABLE 1, AP(4) with a grade of 64 is the number one ranked AP. Thus conventionally, a wireless communication device capable of WLAN and LTE communication would transmit and receive WLAN signals on the channel assigned to AP(4). However, for each different AP, the wireless communication device determines whether reception of data over the WLAN (by the WLAN chip) would be blocked by the simultaneous transmission of data by the LTE chip according to the LTE standard. The wireless communication device further determines, for each different AP, whether transmission of data by the second chip over the WLAN would cause intermodulation during reception of signals by the LTE chip, according to the LTE standard.

Once these additional considerations are taken into account, if the overall throughput of the WLAN and LTE chips is decreased, the grade is adjusted downward. Thus in TABLE 1, it can be seen that AP(1) is provided an adjusted grade of 40, while AP(2)'s initial grade is not changed. This of course indicates that there is no loss of throughput from processing of simultaneous WLAN and LTE signals through AP(2).

AP(3) is provided an adjusted grade of 54, and AP(4) is provided an adjusted grade of 52. Thus three of the four AP received some type of downward grading due to simultaneous processing of WLAN and LTE signals through those APs. Once the adjusted grades are provided for each AP, it is then determined which of the plurality of APs operating in the particular WLAN is provided with the highest adjusted grade. In the example of TABLE 1, AP(2), which originally was provided with the third lowest grade, now has the highest grade (56, and ranked $1^{st}$). As such, the particular wireless communication device under consideration should process WLAN communications on the channel that AP(2) operates on.

Figure 2:
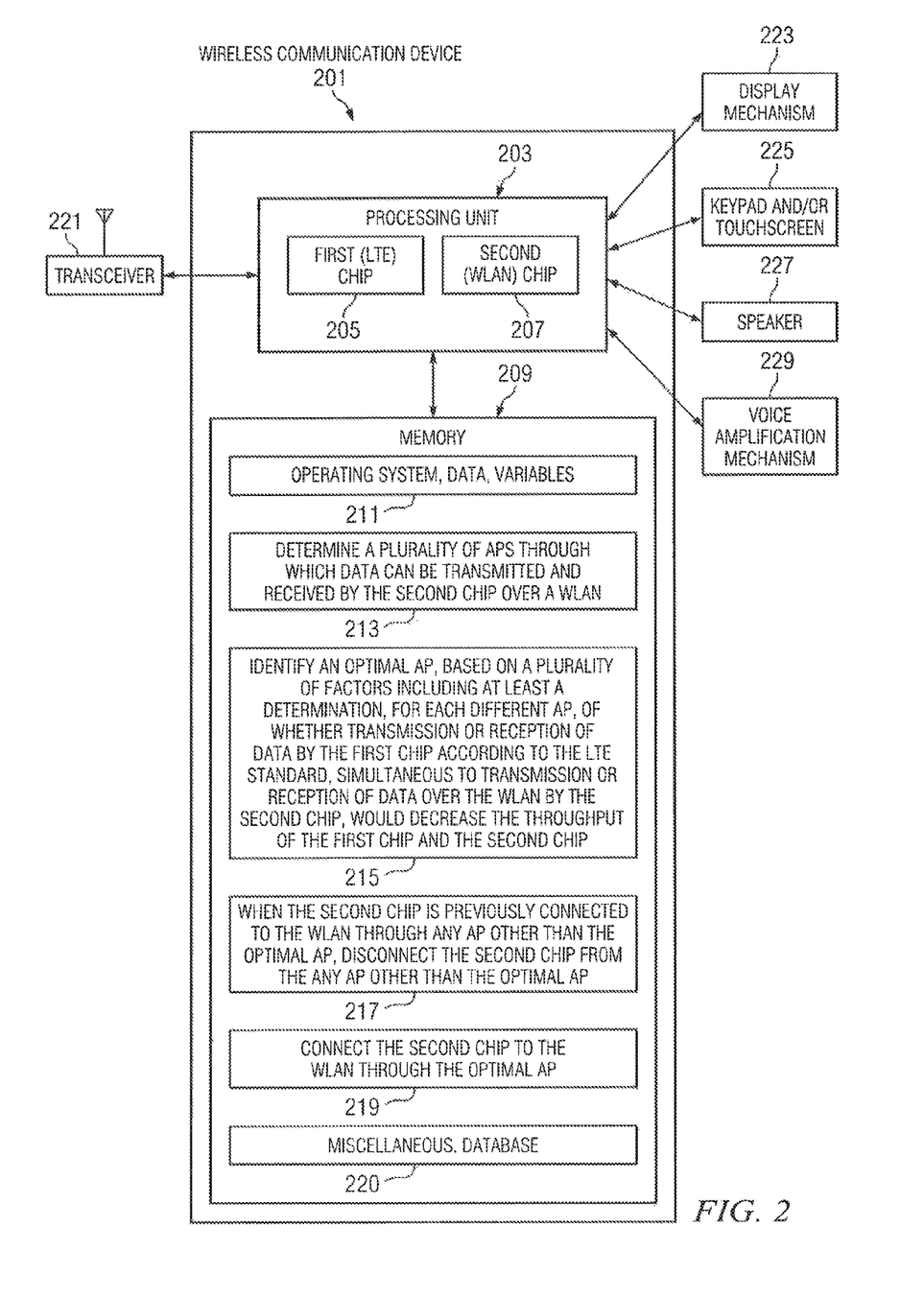
FIG. 2 is a diagram illustrating a device operable to transmit and receive data wirelessly.

Referring now to FIG. 2, a diagram illustrating a device 201 operable to transmit and receive data wirelessly will be discussed and described. The wireless communication device 201 may include a transceiver 221, a processing unit 203, a first (LTE) chip 205, a second (WLAN) chip 207, a memory 209, a display mechanism 223, a keypad and/or touch screen 225, a speaker 227, and a voice amplification mechanism 229. The processing unit 203 including the first chip 205 and the second chip 207 may comprise one or more microprocessors and/or one or more digital signal processors. Certain processing functions of the processing unit 203 may be performed by a microprocessor that is independent of both chips 205, 207.

The memory 209 may be coupled to the processing unit 203 and the first and second chips 205, 207, and may comprise a read-only memory (ROM), a random-access memory (RAM), a programmable ROM (PROM), and/or an electrically erasable read-only memory (EEPROM). The memory 209 may include multiple memory locations for storing, among other things, an operating system, data, and variables 211 for computer programs executed by the processing unit 203, including the first chip 205 and the second chip 207. The computer programs cause the processing unit 203, including the first chip 205 and the second chip 207, to operate in connection with various functions as now described.

A first function 213 causes the processing unit 203 to determine a plurality APs through which data can be transmitted and received by the second chip over a WLAN. A second function 215 causes the processing unit 203 to identify an optimal AP, based on a plurality of factors including at least a determination, for each different AP, of whether transmission or reception of data by the first chip 205 according to the LTE standard, simultaneous to transmission or reception of data over the WLAN by the second chip 207, would decrease the overall throughput of the first chip 205 and the second chip 207.

A third function 217 causes the processing unit 203, when the second chip 207 is previously connected to the WLAN through any AP other than the optimal AP, to disconnect the second chip 207 from the any AP other than the optimal AP. A fourth function 219 causes the processing unit 203 to connect the second chip 207 to the WLAN through the optimal AP. The memory 209 additionally includes a miscellaneous database 220 for storing other data not specifically mentioned herein.

The display mechanism 223, the keypad and/or touch screen 225, the speaker 227, and the voice amplification mechanism 229 each serve to provide traditional telecommunication functions as required. It should be noted that transceiver 221 may include multiple antenna or a single antenna for processing signals on both the WLAN network, and according to the LTE specification.

Figure 3:
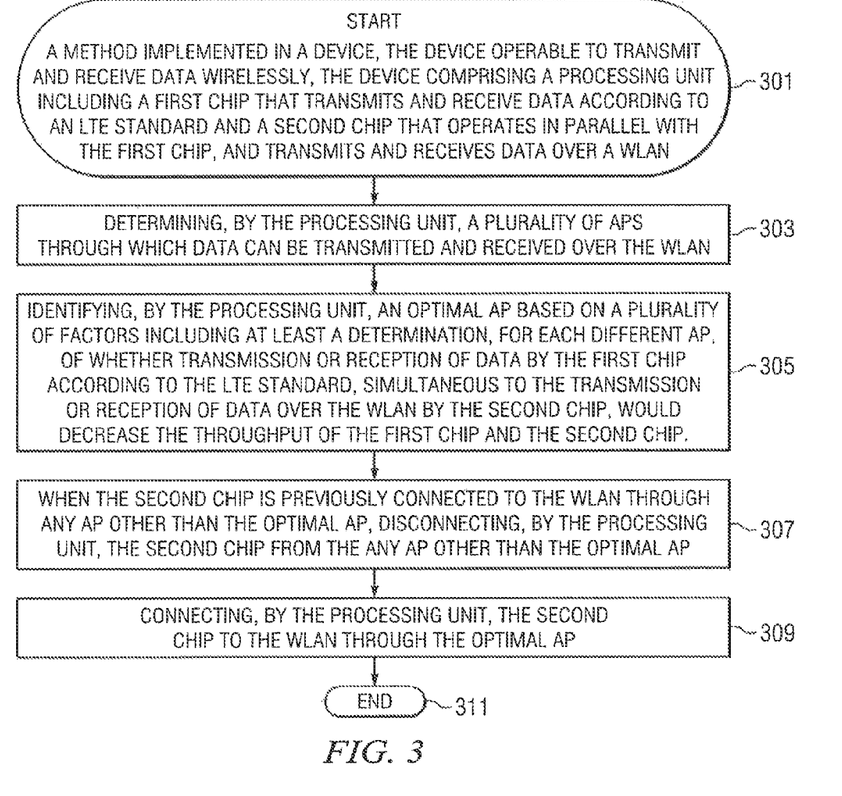
FIG. 3 is a flow diagram illustrating a method implemented in a device operable to transmit and receive data wirelessly.

Referring now to FIG. 3, a flow diagram illustrating a method implemented in a device operable to transmit and receive data wirelessly is discussed and described. At 301, the method starts. The device in which the method is implemented comprises a processing unit including a first chip that transmits and receives data according to an LTE standard and a second chip that operates in parallel with the first chip, and transmits and receive data over WLAN. The method comprises, at 303, determining by the processing unit, a plurality of APs through which data can be transmitted and received by the second chip over the WLAN.

The method further comprises, at 305, identifying by the processing unit, an optimal AP based on a plurality of factors including at least a determination, for each different AP, of whether transmission or reception of data by the first chip according to the LTE standard, simultaneous to transmission or reception of data over the WLAN by the second chip, would decrease the overall throughput of the first chip and the second chip. At 307, the method further comprises, when the second chip is previously connected to the WLAN through any AP other than the optimal AP, disconnecting by the processing unit, the second chip from the any AP other than the optimal AP. The method lastly comprises, at 309, the processing unit connecting the second chip to the WLAN through the optimal AP. At 311, the method ends.

It should be noted that the term "wireless communication unit" denotes a device ordinarily associated with a user and typically a wireless mobile device that may be used with a public network, for example in accordance with a service agreement, or within a private network such as an enterprise network. Examples of such units include personal digital assistants, personal assignment pads, and personal computers equipped for wireless operation, a cellular handset or device, or equivalents thereof provided such units are arranged and constructed for operation in different networks.

It should further be noted that the expressions "transmits and receives data over a wireless local area network" or "transmits and receives data over a WLAN" is defined herein to includes any transmissions or receptions by a wireless communication device that occurs in accord with the 802.11 specification, or the WiFi specification as commercially available. It should also be noted that while the instant disclosure may emphasize 802.11 communications in the ISM band, the principles described in this disclosure are equally applicable to Bluetooth™ communications in a portion of the ISM band between 2000-2483.5 MHz. More specifically, any claims directed to simultaneous Bluetooth™ communications and LTE communications that are of similar scope to claims directed to simultaneous WLAN and LTE communications should be viewed as being supported by the instant disclosure.

It should also be noted that the expressions "transmits and receives data according to a long term evolution standard" or "transmits and receives data according to an LTE standard" is defined herein to include any transmission or receptions based on 3rd generation mobile telecommunications that fulfill the International Mobile Telecommunications-2000 (IMT-2000) specifications by the International Telecommunication Union or the March 2008 International Telecommunications Union-Radio (ITU-R) specified set of requirements for 4G standards, named the International Mobile Telecommunications Advanced (IMT-Advanced) specification.

However, as it is well known that the first-release versions of Mobile WiMAX and LTE support much lower rates than the 1 Gbit/s peak bit rate of the IMT-Advanced specification, the expression "transmits and receives data according to an LTE standard" should be understood to include processing signals under any commercially known LTE standard, including those designed according to the 3PP Project's Releases 8 and 9. Additionally, the expression "transmits and receives data according to an LTE standard" should be understood to include processing communications according to the WiMAX family of standards under IEEE 802.16

The instant disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A device, operable to transmit and receive data wirelessly, comprising:
    a processing unit including
        a first chip that transmits and receives data according to a long term evolution (LTE) standard, and
        a second chip that operates in parallel with the first chip, and transmits and receives data over a wireless local area network (WLAN), the processing unit being configured to:
    determine a plurality of access points (AP) through which data can be transmitted and received by the second chip over the WLAN;
    identify an optimal AP, based on a plurality of factors including at least a determination, for each different AP, of whether transmission or reception of data by the first chip according to the LTE standard, simultaneous to transmission or reception of data over the WLAN by the second chip, would affect the overall throughput of the first chip and the second chip;
    when the second chip is previously connected to the WLAN through any AP other than the optimal AP, disconnect the second chip from the any AP other than the optimal AP; and
    connect the second chip to the WLAN through the optimal AP.

2. A device according to claim 1, wherein
the plurality of factors further includes at least a performance speed capacity of each different AP, a network load of each different AP, a received signal strength indication (RSSI) of each different AP, and a signal to noise ratio (SNR) of each different AP.

3. A device according to claim 2, wherein
identifying an optimal AP comprises:
    providing a grade to each of the plurality of APs based on the plurality of factors including the performance speed capacity of each different AP, the network load of each different AP, the RSSI of each different AP, and the SNR of each different AP, a higher grade indicating a higher throughput of the first chip and the second chip;
    where a determination that the transmission or reception of data by the first chip according to the LTE standard, simultaneous to the transmission or reception of data over the WLAN by the second chip of a particular AP, would decrease the overall throughput of the first chip and the second chip of the particular AP, downwardly adjusting the grade for the particular AP; and
    subsequently determining which AP from the plurality of APs has the highest grade.

4. A device according to claim 1, wherein
the determination, for each different AP, of whether transmission or reception of data by the first chip according to the LTE standard, simultaneous to the transmission or reception of data over the WLAN by the second chip, would decrease the overall throughput of the first chip and the second chip, includes:
    determining, for each different AP, whether reception of data by the second chip over the WLAN would be blocked by the simultaneous transmission of data by the first chip according to the LTE standard.

5. A device according to claim 1, wherein
the determination, for each different AP, of whether transmission or reception of data by the first chip according to the LTE standard, simultaneous to transmission or reception of data over the WLAN by the second chip, would decrease the overall throughput of the first chip and the second chip, includes:
    determining, for each different AP, whether transmission of data by the second chip over the WLAN would cause intermodulation during reception of data by the first chip according to the LTE standard.

6. A device according to claim 1, wherein
the determination, for each different AP, of whether transmission or reception of data by the first chip according to the LTE standard, simultaneous to transmission or reception of data over the WLAN by the second chip, would decrease the overall throughput of the first chip and the second chip, includes:
    determining, for each different AP, whether reception of data by the second chip over the WLAN would be blocked by the simultaneous transmission of data by the first chip according to the LTE standard, and
    determining, for each different AP, whether transmission of data by the second chip over the WLAN would cause intermodulation during reception of data by the first chip according to the LTE standard.

7. A device according to claim 1, wherein
identifying of an optimal AP comprises:
    providing a grade to each of the plurality of APs, based on one or more performance factors other than the determination, for each different AP, of whether transmission or reception of data by the first chip according to the LTE standard, simultaneous to transmission or reception of data over the WLAN by the second chip, would decrease the overall throughput of the first chip and the second chip, a higher grade indicating a higher throughput of the first chip and the second chip;
    where a determination that the transmission or reception of data by the first chip according to the LTE standard, simultaneous to the transmission or reception of data over the WLAN by the second chip of a particular AP, would decrease the overall throughput of the first chip and the second chip for the particular AP, downwardly adjusting the grade for the particular AP; and
    subsequently determining which AP from the plurality of APs has the highest grade.

8. A method implemented in a device, the device operable to transmit and receive data wirelessly, the device comprising a processing unit including a first chip that transmits and receives data according to a long term evolution (LTE) standard and a second chip that operates in parallel with the first chip, and transmits and receive data over a wireless local area network (WLAN), the method comprising:
    identifying, by the processing unit, an optimal AP based on a plurality of factors including at least a determination, for each different AP, of whether transmission or reception of data by the first chip according to the LTE standard, simultaneous to transmission or reception of data over the WLAN by the second chip, would affect the overall throughput of the first chip and the second chip;
    when the second chip is previously connected to the WLAN through any AP other than the optimal AP, disconnecting, by the processing unit, the second chip from the any AP other than the optimal AP; and connecting, by the processing unit, the second chip to the WLAN through the optimal AP.

9. A method according to claim 8, wherein
the plurality of factors further includes at least a performance speed capacity of each different AP, a network load of each different AP, a received signal strength indication (RSSI) of each different AP, and a signal to noise ratio (SNR) of each different AP.

10. A method according to claim 9, wherein
the identifying an optimal AP comprises:
providing, by the processing unit, a grade to each of the plurality of APs based on the plurality of factors including the performance speed capacity of each different AP, the network load of each different AP, the RSSI of each different AP, and the SNR of each different AP, a higher grade indicating a higher throughput of the first chip and the second chip;

where a determination that the transmission or reception of data by the first chip according to the LTE standard, simultaneous to the transmission or reception of data over the WLAN by the second chip of a particular AP, would decrease the overall throughput of the first chip and the second chip, downwardly adjusting, by the processing unit, the grade of the particular AP; and subsequently determining, by the processing unit, which AP from the plurality of APs has the highest grade.

11. A method according to claim 8, wherein
the determination, for each different AP, of whether transmission or reception of data by the first chip according to the LTE standard, simultaneous to transmission or reception of data over the WLAN by the second chip, would decrease the overall throughput of the first chip and the second chip, includes determining, by the processing unit, for each different AP, whether reception of data by the second chip over the WLAN would be blocked by the simultaneous transmission of data by the first chip according to the LTE standard.

12. A method according to claim 8, wherein
the determination, for each different AP, of whether transmission or reception of data by the first chip according to the LIE standard, simultaneous to transmission or reception of data over the WLAN by the second chip, would decrease the overall throughput of the first chip and the second chip, includes determining, by the processing unit, for each different AP, whether transmission of data by the second chip over the WLAN would cause intermodulation during reception of data by the first chip according to the LTE standard.

13. A method according to claim 8, wherein
the determination, for each different AP, of whether transmission or reception of data by the first chip according to the LTE standard, simultaneous to transmission or reception of data over the WLAN by the second chip, would decrease the overall throughput of the first chip and the second chip, includes determining, by the second chip, for each different AP, whether reception of data by the second chip over the WLAN would be blocked by the simultaneous transmission of data by the first chip according to the LTE standard, and determining, by the second chip, for each different AP, whether transmission of data by the second chip over the WLAN cause intermodulation during reception of data by the first chip according to the LTE standard.

14. A method according to claim 8, wherein
identifying of an optimal AP comprises:
providing, by the processing unit, a grade to each of the plurality of APs, based on one or more performance factors other than the determination, for each different AP, of whether transmission or reception of data by the first chip over the LTE, simultaneous to transmission or reception of data over the WLAN by the second chip, decreases the overall throughput of the first chip and the second chip, a higher grade indicating a higher throughput of the first chip and the second chip;

where a determination that the transmission or reception of data by the first chip according to the LTE standard, simultaneous to the transmission or reception of data over the WLAN by the second chip of a particular AP, would decrease the overall throughput of the first chip and the second chip of the particular AP, downwardly adjusting, by the processing unit, the grade of the particular AP; and subsequently determining, by the processing unit, which AP from the plurality of APs has the highest grade.

15. A non-transitory computer readable storage medium with instructions stored thereon, such that when executed by a processing unit in a device operable to transmit and receive data wirelessly, the processing unit including a first chip that transmits and receives data according to a long term evolution (LTE) standard and a second chip that operates in parallel with the first chip and transmits and receive data over a wireless local area network (WLAN), a method in the device is performed, comprising:

determining a plurality of access points (AP) through which data can be transmitted and received by the second chip over the WLAN;

identifying an optimal. AP based on a plurality of factors including at least a determination, for each different AP, of whether transmission or reception of data by the first chip according to the LTE standard, simultaneous to transmission or reception of data over the WLAN by the second chip, would affect the overall throughput of the first chip and the second chip;

when the second chip is previously connected to the WLAN through any AP other than the optimal AP, disconnecting the second chip from the any AP other than the optimal AP; and connecting, by the processing unit, the second chip to the WLAN through the optimal AP.

16. A non-transitory computer readable storage medium according to claim 15, wherein
the plurality of factors further includes at least a performance speed capacity of each different AP, a network load of each different AP, a received signal strength indication (RSSI) of each different AP, and a signal to noise ratio (SNR) of each different AP.

17. A non-transitory computer readable storage medium according to claim 16, wherein
identifying an optimal AP comprises:
providing a grade to each of the plurality of APs based on the plurality of factors including the performance speed capacity of each different AP, the network load of each different AP, the RSSI of each different AP, and the SNR of each different AP, a higher grade indicating a higher throughput of the first chip and the second chip;

where a determination that the transmission or reception of data by the first chip according to the LTE standard, simultaneous to the transmission or reception of data over the WLAN by the second chip of a particular AP, would decrease the overall throughput of the first chip and the second chip, downwardly adjusting the grade of the particular AP; and subsequently determining which AP from the plurality of APs has the highest grade.

18. A non-transitory computer readable storage medium according to claim 15, wherein the determination, for each different AP, of whether transmission or reception of data by the first chip according to the LTE standard, simultaneous to transmission or reception of data over the WLAN by the second chip, would decrease the overall throughput of the first chip and the second chip, includes determining, for each different AP, whether reception of data by the second chip over the WLAN would be blocked by the simultaneous transmission of data by the first chip according to the LTE standard.

19. A non-transitory computer readable storage medium according to claim 15, wherein the determination, for each different AP, of whether transmission or reception of data by the first chip according to the LTE standard, simultaneous to transmission or reception of data over the WLAN by the second chip, would decrease the overall throughput of the first chip and the second chip, includes determining, for each different AP, whether transmission of data by the second chip over the WLAN would cause intermodulation during reception of data by the first chip according to the LTE standard.

20. A non-transitory computer readable storage medium according to claim 15, wherein identifying of an optimal AP comprises:

providing a grade to each of the plurality of APs, based on one or more performance factors other than the determination, for each different AP, of whether transmission or reception of data by the first chip over the LTE, simultaneous to transmission or reception of data over the WLAN by the second chip, decreases the overall throughput of the first chip and the second chip, a higher grade indicating a higher throughput of the first chip and the second chip;

where a determination that the transmission or reception of data by the first chip according to the LTE standard, simultaneous to the transmission or reception of data over the WLAN by the second chip of a particular AP, would decrease the overall throughput of the first chip and the second chip of the particular AP, downwardly adjusting the grade of the particular AP; and subsequently determining which AP from the plurality of APs has the highest grade.

* * * * *